US012617462B2

(12) United States Patent      (10) Patent No.: US 12,617,462 B2
Zuccone      (45) Date of Patent:     May 5, 2026

(54) ROD ASSEMBLY

(71) Applicant: Todd Zuccone, Phoenix, AZ (US)

(72) Inventor: Todd Zuccone, Phoenix, AZ (US)

( * ) Notice: Subject to any disclaimer, the term of this patent is extended or adjusted under 35 U.S.C. 154(b) by 0 days.

(21) Appl. No.: 18/538,394

(22) Filed: Dec. 13, 2023

(65) Prior Publication Data

US 2025/0196919 A1     Jun. 19, 2025

(51) Int. Cl.
    *B62D 7/20*      (2006.01)
(52) U.S. Cl.
    CPC ..................................... *B62D 7/20* (2013.01)
(58) Field of Classification Search
    CPC . B62D 7/20; B60G 7/00; B60G 7/001; B60G
        11/18; B60G 11/181; B60G 11/182;
        B60G 11/183; B60G 11/184; B60G
        11/185; B60G 11/189; B60G 11/20;
        B60G 17/025; B60G 2202/13; B60G
        2202/132; B60G 2202/134; B60G
        2204/4307
    See application file for complete search history.

(56) References Cited

U.S. PATENT DOCUMENTS

| | | | | | |
|---|---|---|---|---|---|
| 655,136 | A | * | 7/1900 | Vandegrift | F16G 11/04 |
| | | | | | 403/314 |
| 1,643,970 | A | * | 10/1927 | Wilkins | B60G 9/00 |
| | | | | | 267/66 |
| 4,093,388 | A | * | 6/1978 | MacArthur | B62D 7/20 |
| | | | | | 403/46 |
| 4,763,922 | A | * | 8/1988 | Nishikawa | B60G 21/0551 |
| | | | | | 29/517 |
| 5,004,367 | A | * | 4/1991 | Wood, Jr. | F16B 39/126 |
| | | | | | 403/314 |
| 5,306,095 | A | * | 4/1994 | Snitgen | B62D 7/20 |
| | | | | | 403/354 |
| 5,551,722 | A | * | 9/1996 | Schwartz | B60G 21/0551 |
| | | | | | 280/124.152 |
| 5,603,583 | A | * | 2/1997 | Jackson | B60G 7/005 |
| | | | | | 403/46 |
| 6,851,691 | B2 | * | 2/2005 | Rasidescu | B60G 3/14 |
| | | | | | 280/124.135 |
| 6,904,643 | B2 | * | 6/2005 | Duffy | E05F 3/108 |
| | | | | | 16/83 |
| 7,461,851 | B2 | * | 12/2008 | Yamamura | B60G 3/20 |
| | | | | | 180/311 |
| 8,506,199 | B2 | * | 8/2013 | Rump | B62D 17/00 |
| | | | | | 403/45 |

(Continued)

*Primary Examiner* — Laura Freedman
(74) *Attorney, Agent, or Firm* — Schmeiser, Olsen & Watts LLP

(57)           ABSTRACT

A rod, such as a radius rod, is provided. The radius rod may include a carbon fiber tube member that includes an aperture extending from one end of the tube member through the opposing end of the tube member. The radius rod may further include an inner threaded rod member located within the carbon fiber tube member. The radius rod may further include two rod couplers threaded onto opposing ends of the inner threaded rod member, wherein a portion of the rod couplers extend into the carbon fiber tube member and engage the carbon fiber tube member on each end to maintain the inner threaded rod member coaxial with the carbon fiber tube member when not under load. Further, the radius rod may include two rod end members, each rod end member coupled to one rod coupler.

15 Claims, 8 Drawing Sheets

(56)  References Cited

U.S. PATENT DOCUMENTS

| | | | | |
|---|---|---|---|---|
| 8,746,719 | B2 * | 6/2014 | Safranski | B60G 7/006 |
| | | | | 280/124.152 |
| 9,067,669 | B2 * | 6/2015 | Wheeler | B64C 1/06 |
| 9,242,672 | B2 * | 1/2016 | Brady | B62D 21/11 |
| 9,452,658 | B2 * | 9/2016 | Smith | B60G 21/0556 |
| 9,732,786 | B2 * | 8/2017 | Trotter | B60G 7/003 |
| 9,776,481 | B2 * | 10/2017 | Deckard | B60R 22/34 |
| 9,861,541 | B2 * | 1/2018 | Boretto | A61G 5/0816 |
| 9,884,647 | B2 * | 2/2018 | Peterson | B62D 21/11 |
| 9,988,083 | B1 * | 6/2018 | Smith | B60G 3/20 |
| 11,034,399 | B2 * | 6/2021 | Bodin | B60G 11/20 |
| 11,046,138 | B2 * | 6/2021 | Everline | B60G 11/04 |
| 11,142,033 | B2 * | 10/2021 | Yoshida | B60G 3/20 |
| 11,649,850 | B2 * | 5/2023 | Funck | F16D 1/06 |
| | | | | 384/280 |
| 11,958,535 | B2 * | 4/2024 | Gordon | B60G 13/005 |
| 2003/0160414 | A1 * | 8/2003 | Pincerato | B60G 7/001 |
| | | | | 280/93.51 |
| 2005/0281610 | A1 * | 12/2005 | MacLean | F16C 11/0633 |
| | | | | 403/56 |
| 2012/0061934 | A1 * | 3/2012 | Scaduto | B60G 11/181 |
| | | | | 280/124.106 |
| 2020/0140010 | A1 * | 5/2020 | Ross | E01F 15/145 |
| 2023/0008863 | A1 * | 1/2023 | Danze | B60G 7/001 |

* cited by examiner

ROD ASSEMBLY

BACKGROUND OF THE INVENTION

Technical Field

This invention relates generally to a rod, and more particularly to a radius rod formed of carbon fiber.

State of the Art

Off-road vehicles are becoming more and more prevalent in ownership, use, racing and so forth. Particularly, utility terrain vehicles (UTVs) are the typical off-road vehicle type that people purchase and utilize. UTVs and other off-road vehicles have a suspension to handle the rigors of driving over uneven, rocky, and otherwise non-flat surfaces. The use of suspension operates to maximize the contact and friction between the tires of the vehicle and the ground surface, to stay stable in the rocky, uneven terrain and so forth. Part of the suspension system on off-road vehicles are radius rods. A radius rod is a suspension link intended to control wheel motion in the longitudinal (fore-aft) direction. The radius rod is typically connected on one end to the wheel carrier or axle and on the other end to the chassis or frame of the vehicle. Radius rods are typically formed of steel and are heavy and detrimental to uses, such as racing. Rods of this type are also employed in steering systems, such as tie rods.

Accordingly, there is a need in the industry for rods, such as radius rods, formed of carbon fiber that provides the support of conventional radius rods, but with less weight.

SUMMARY OF THE INVENTION

An embodiment includes a rod assembly comprising at least one rod, wherein the at least one rod comprises: a tube member comprising carbon fiber and having an aperture extending from a first end of the tube member through a second end of the tube member; an inner threaded rod member located within the tube member; two rod couplers threaded onto opposing ends of the inner threaded rod member, wherein a portion of each of the two rod couplers extends into the tube member and engages the tube member on the first and second ends to maintain the inner threaded rod member coaxial with the tube member when the tube member is not under load; and two rod end members, each of the two rod end members coupled to one rod coupler of the two rod couplers.

The two rod couplers may be fixedly secured to the tube member. A first rod end member of the two rod end members may be coupled to a shear plate and a frame. A second rod end member of the two rod end members may be coupled to a wheel component. The rod assembly may further comprise a plurality of rods. The inner threaded rod member may comprise aluminum. The rod assembly may be a radius rod assembly for a suspension system.

An embodiment includes a rod assembly comprising at least one rod, wherein the at least one rod comprises: at least two tube members comprising carbon fiber, each of the at least two tube members having an aperture extending from a first end of each of the at least two tube members through a second end of each of the at least two tube members; an inner threaded rod member located within each of the at least two tube members; each of the inner threaded rod members having opposing ends; at least one center coupler provided between one of the opposing ends of each of the inner threaded rod members; two rod couplers respectively threaded onto an opposite one of the opposing ends of each of the inner threaded rod members, wherein a portion of each of the two rod couplers extends into each of the at least two tube members and engages the at least two tube members on the first and second ends to maintain each of the inner threaded rod members coaxial with each of the at least two tube members when each of the at least two tube members is not under load; and two rod end members, each of the two rod end members respectively coupled to one rod coupler of the two rod couplers.

The two rod couplers may be fixedly secured to each of the at least two tube members. A first rod end member of the two rod end members may be coupled to a shear plate and a frame. A second rod end member of the two rod end members may be coupled to a wheel component. The rod assembly may further comprise a plurality of rod assemblies. Each of the inner threaded rod members may comprise aluminum. The rod assembly may be a radius rod assembly for a suspension system.

Another embodiment includes a method of making a rod, wherein the method comprises: providing a tube member comprising carbon fiber and having an aperture extending from a first end of the tube member through a second end of the tube member; locating an inner threaded rod member within the tube member; threadingly coupling two rod couplers onto opposing ends of the inner threaded rod member, extending a portion of each of the two rod couplers into the tube member and engaging the tube member on the first and second ends to maintain the inner threaded rod member coaxial with the tube member when the tube member is not under load; providing two rod end members; and coupling each of the two rod end members to one rod coupler of the two rod couplers.

The method may further comprise fixedly securing the two rod couplers to the tube member. The method may further comprise coupling a first rod end member of the two rod end members to a shear plate and a frame. The method may further comprise coupling a second rod end member of the two rod end members to a wheel component. The inner threaded rod member may comprise aluminum. The rod may be a radius rod for a suspension system.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to carbon fiber rods, including, but not limited to, tie rods and/or radius rods. This carbon fiber rod provides at least the same functionality as a conventional steel rod, but at a fraction of the weight of the conventional steel rod.

Figure 1:
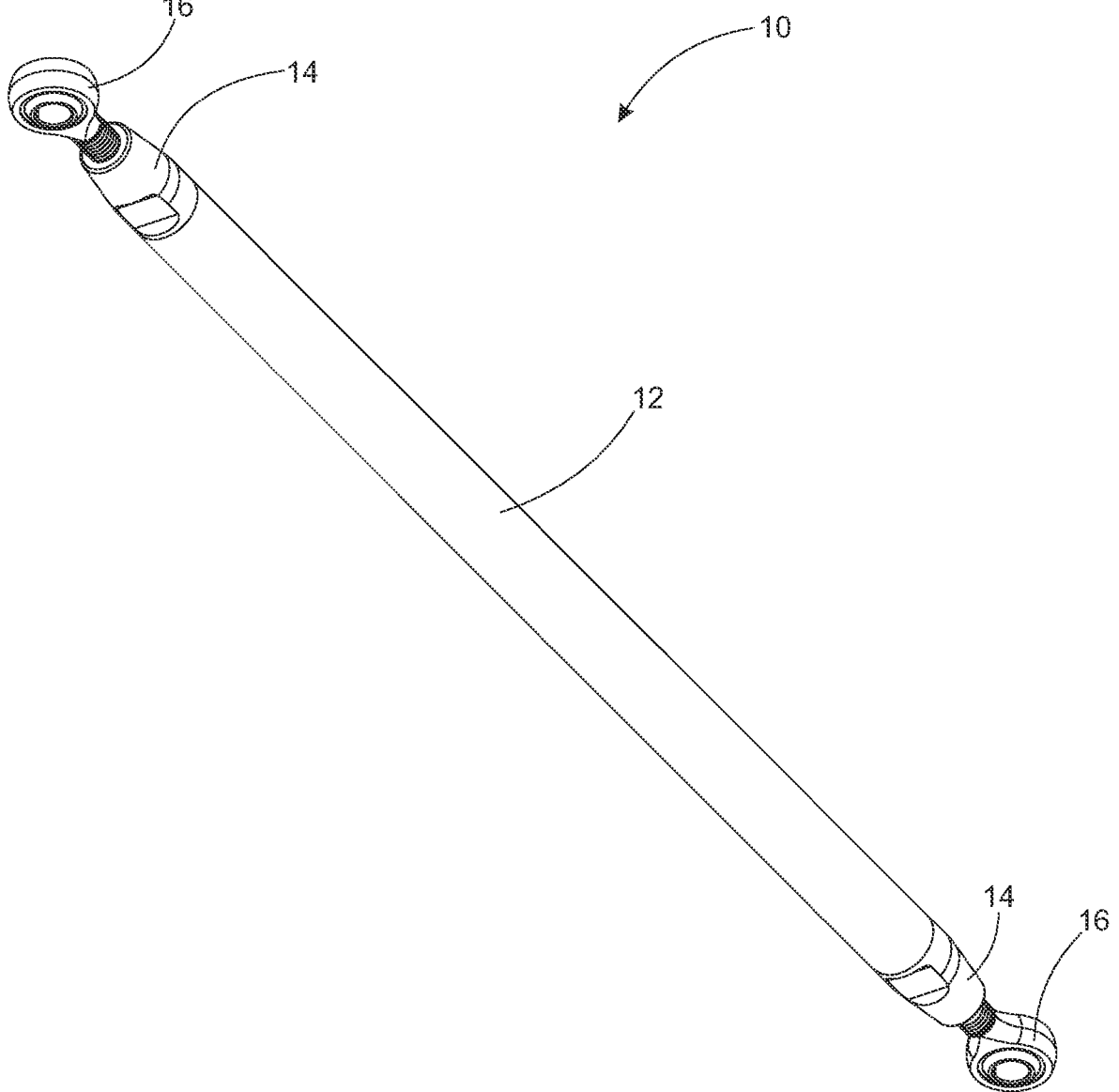
FIG. 1 is a perspective view of a rod assembly in accordance with an embodiment.
Figure 2:
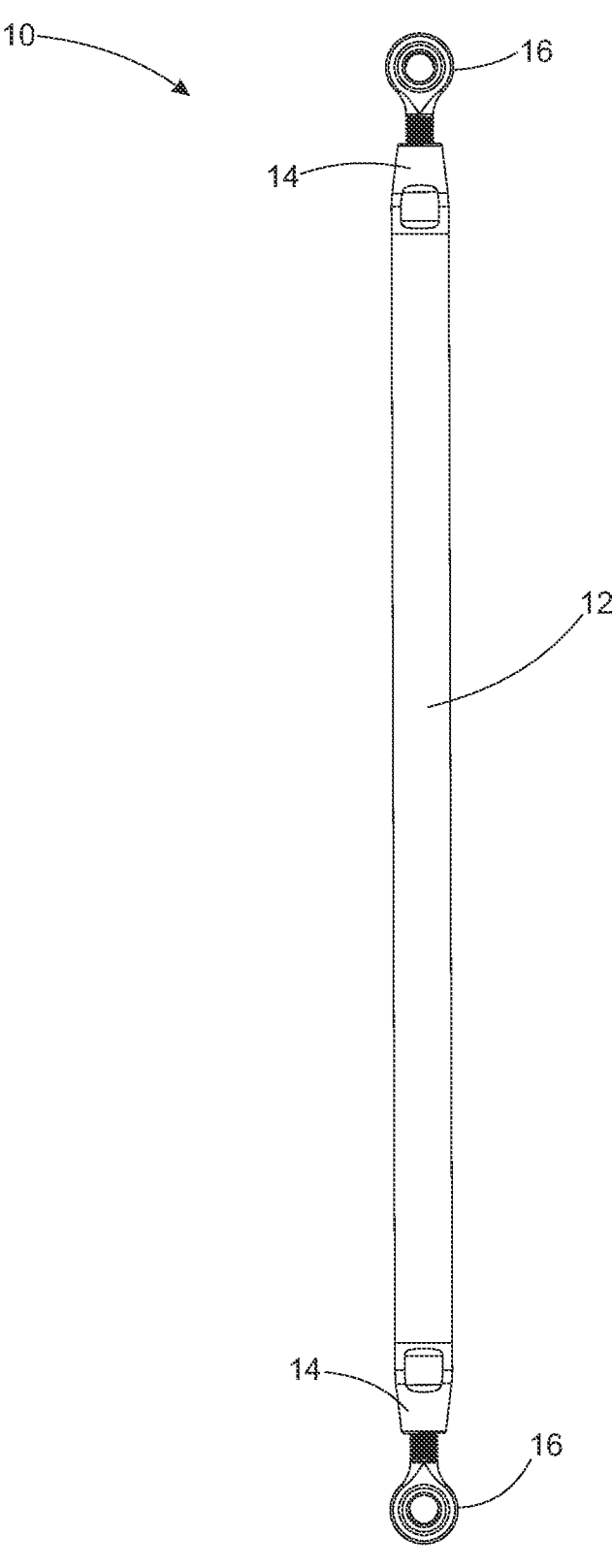
FIG. 2 is a side view of a rod assembly in accordance with an embodiment.
Figure 3:
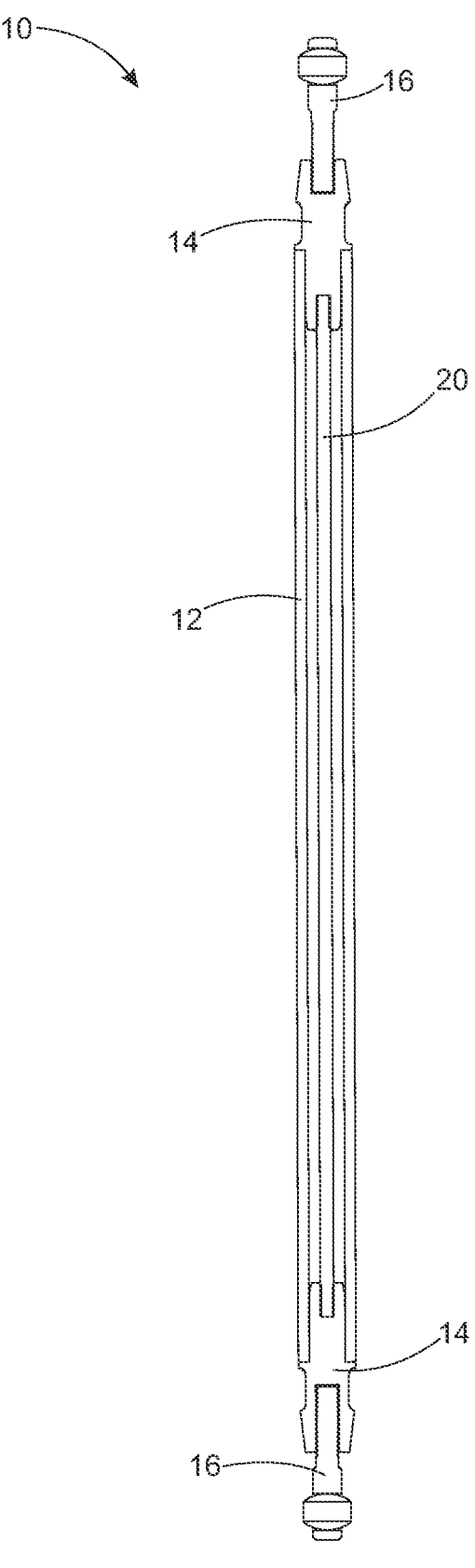
FIG. 3 is a section view of a rod assembly in accordance with an embodiment.

Referring to the drawings, FIGS. 1-3 depict an embodiment of a rod 10 in accordance with an embodiment of the present invention. The rod 10, such as a radius rod, comprises a carbon fiber tube member 12. The tube member 12 includes an aperture that extends from one end of the tube member 12 through an opposing end of the tube member 12. The rod 10 further comprises an inner threaded rod member 20. The inner threaded rod member 20 is located internally to the tube member 12, wherein the inner threaded rod member 20 extends within the aperture of the tube member 12.

The rod 10 may further comprise two rod couplers 14. The rod couplers 14 may be coupled to the inner threaded rod member 20. With the threaded rod member 20 located within the tube member 12, one rod coupler 14 may be coupled to one end of the threaded rod member 20 and the other rod coupler 14 may be coupled to one end of the threaded rod member 20. A portion of the rod couplers 14 extend into the carbon fiber tube member 12 (see FIG. 3) and engage the carbon fiber tube member 12 on each end to maintain the inner threaded rod member 20 coaxial with the carbon fiber tube member 12 when not under load. The rod couplers 14 may then be bonded to the carbon fiber tube member 12. In at least this way, the inner threaded rod member 20 draws the rod couplers 14 together for added strength and eliminates the rod couplers 14 from coming loose. This adds additional support when the rod 10 is in a (pull) tension state. The inner threaded rod member 20 may be formed of aluminum. The use of carbon fiber and aluminum will be lighter than conventional all aluminum or other metal materials such as steel.

Figure 4:
FIG. 4 is a perspective view of a plurality of rod assemblies coupled to a shear plate in accordance with an embodiment.

The rod 10 may also further comprise two rod end members 16. Each rod end member 16 may be coupled to one rod coupler 14. The rod end members 16 may then be used to couple to a frame 32 and wheel component 34 with the end members 16 coupled to the frame 32 are also coupled to a shear plate 30 as depicted in FIG. 4. The configuration of the shear plate 30 with a plurality of rods 10 shown in FIG. 4 are provided as an exemplary use, with one of the rods 10 having the carbon fiber tube member 12 not visible to show the interior components of the rod 10, when coupled to a shear plate 30 on one end.

Some radius rods may be subject to more compression forces, such as the upper rod as shown in FIG. 4 (see rods with numbering applied thereto for an indication of the upper rod). FIGS. 5-8 depict an embodiment of the rod 10 to address these additional compression forces. In these embodiments, the rod 10 comprises carbon fiber tube members 12a and 12b. The tube members 12a and 12b each include an aperture that extend from one end of the tube member 12a and 12b respectively through an opposing end of the tube member 12a and 12b respectively. The rod 10 further comprises inner threaded rod members 20a and 20b. The inner threaded rod member 20a is located internally to the tube member 12a, wherein the inner threaded rod member 20a extends within the aperture of the tube member 12a. The inner threaded rod member 20b is located internally to the tube member 12b, wherein the inner threaded rod member 20b extends within the aperture of the tube member 12b.

The rod 10 may further comprise two rod couplers 14 and a center coupler 18. One rod coupler 14 may be coupled to one end of the threaded rod member 20a and the center coupler 18 may be coupled to the other end of the threaded rod member 20a. A portion of the rod coupler 14 and a portion of the center coupler 18 may extend into the carbon fiber tube member 12a (see FIGS. 5 and 8) and engage the carbon fiber tube member 12a on each end to maintain the inner threaded rod member 20a coaxial with the carbon fiber tube member 12a when not under load. The rod coupler 14 and the center coupler 18 may then be bonded to the carbon fiber tube member 12a. The other rod coupler 14 may be coupled to one end of the threaded rod member 20b and the center coupler 18 may be coupled to the other end of the threaded rod member 20b. A portion of the rod coupler 14 and a portion of the center coupler 18 may extend into the carbon fiber tube member 12b (see FIG. 5) and engage the carbon fiber tube member 12b on each end to maintain the inner threaded rod member 20b coaxial with the carbon fiber tube member 12b when not under load. The rod coupler 14 and the center coupler 18 may then be bonded to the carbon fiber tube member 12b. In at least this way, the inner threaded rod members 20a and 20b draw the rod couplers 14 together with the center coupler 18 between for added strength and eliminate the rod couplers 14 from coming loose. This adds additional support when the rod 10 is in a (pull) tension state. The inner threaded rod members 20a and 20b may be formed of aluminum. The use of carbon fiber and aluminum will be lighter than conventional all aluminum or other metal materials such as steel.

Figure 5:
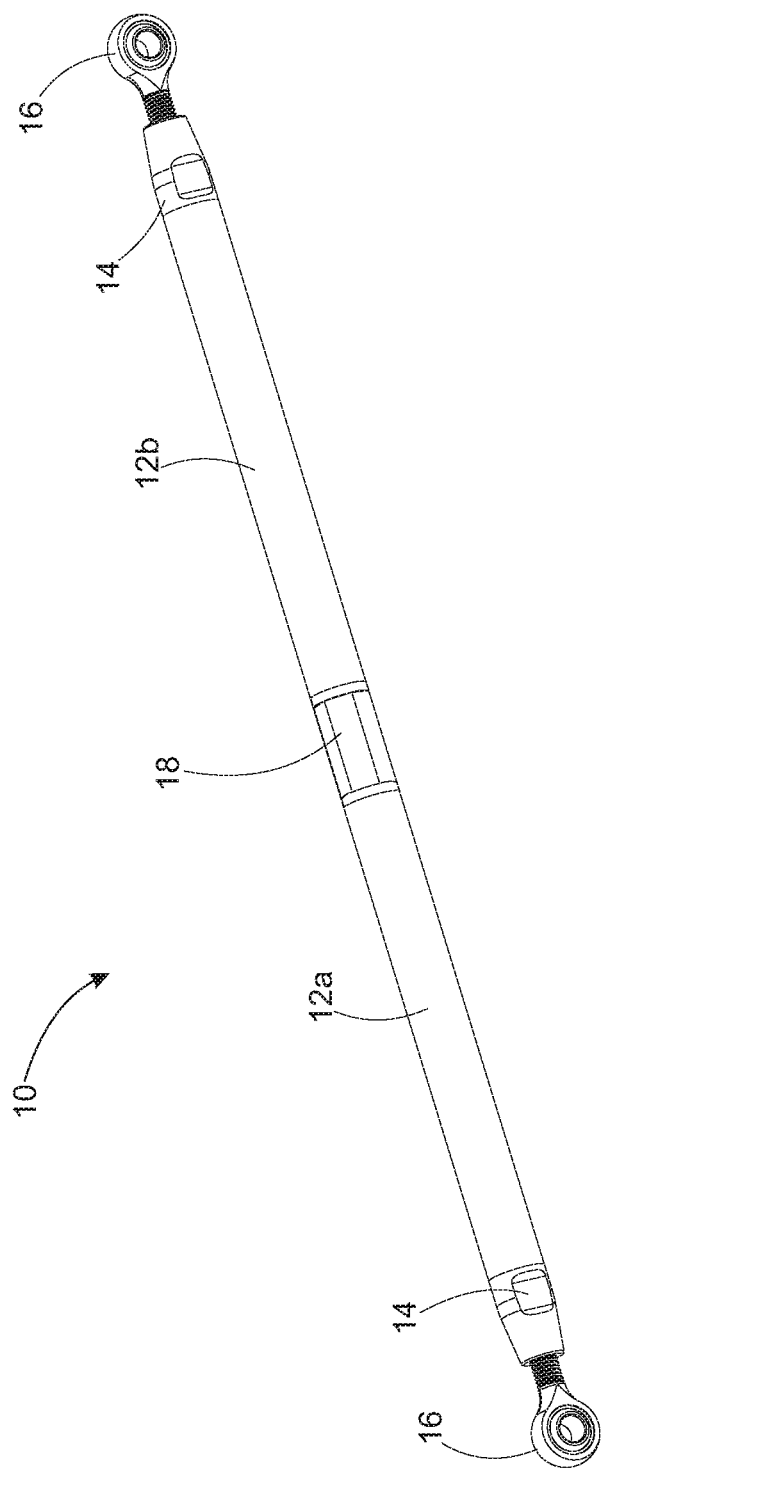
FIG. 5 is a perspective view of a rod assembly in accordance with an embodiment.
Figure 6:
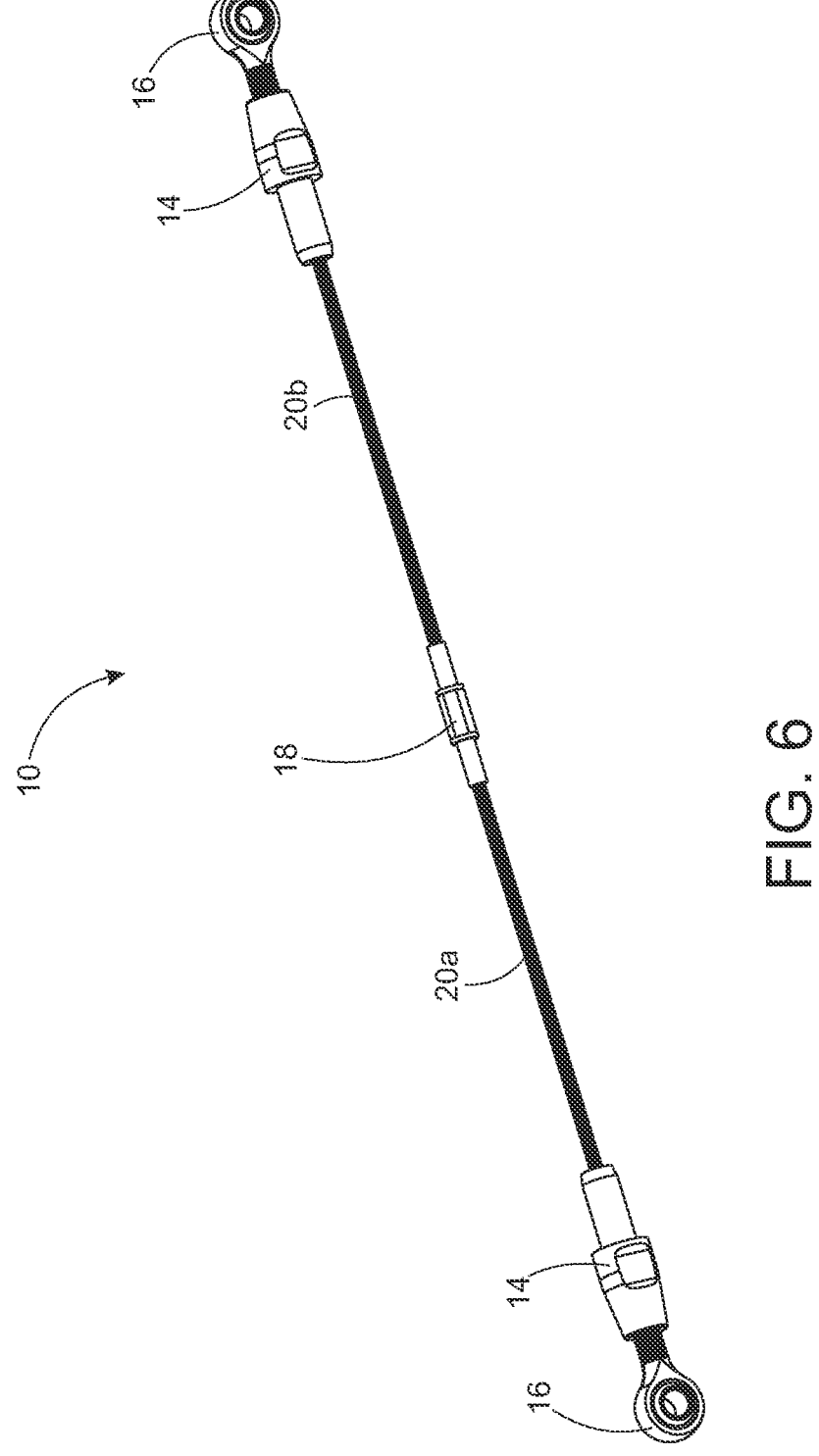
FIG. 6 is a perspective view of the rod assembly of FIG. 5 with tube members removed in accordance with an embodiment.
Figure 7:
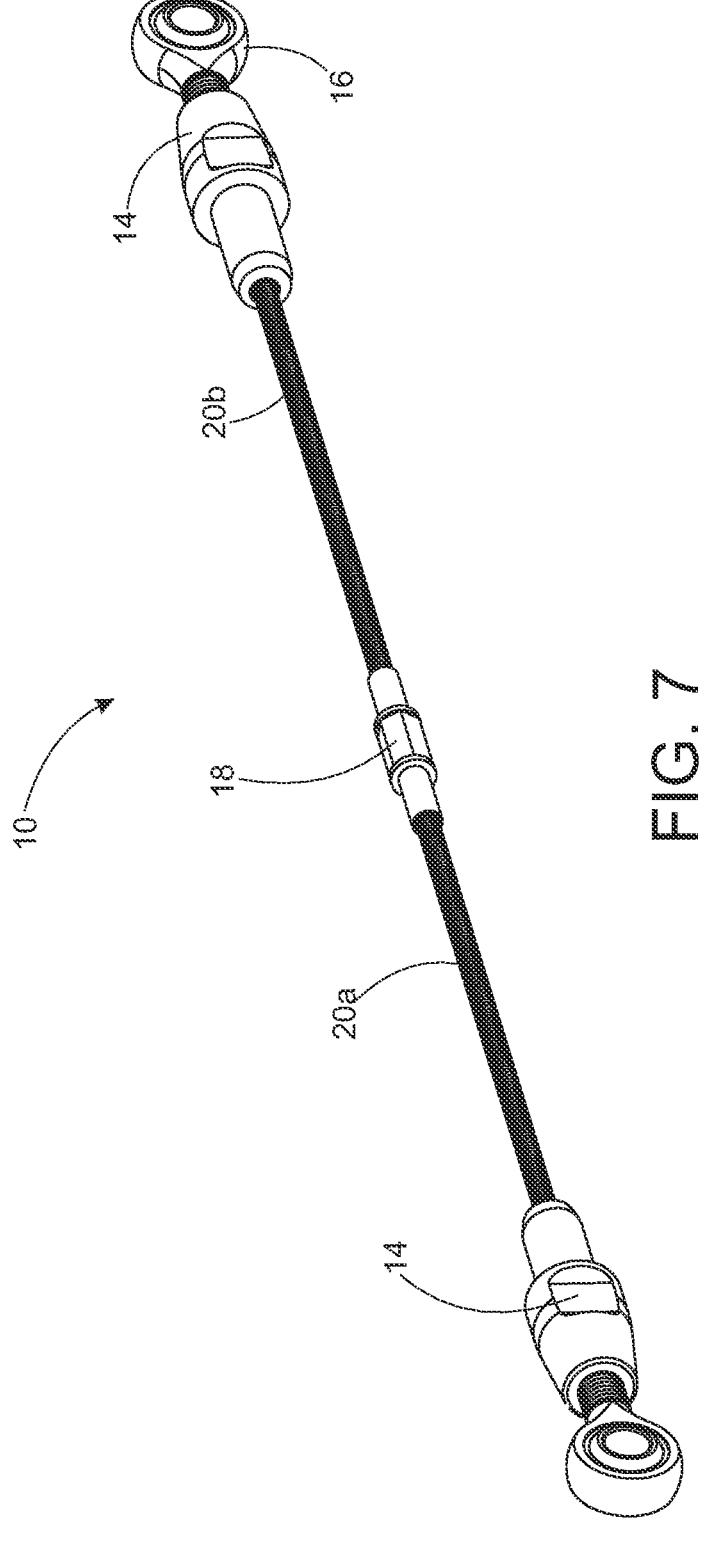
FIG. 7 is another perspective view of the rod assembly of FIG. 5 with tube members removed in accordance with an embodiment.
Figure 8:
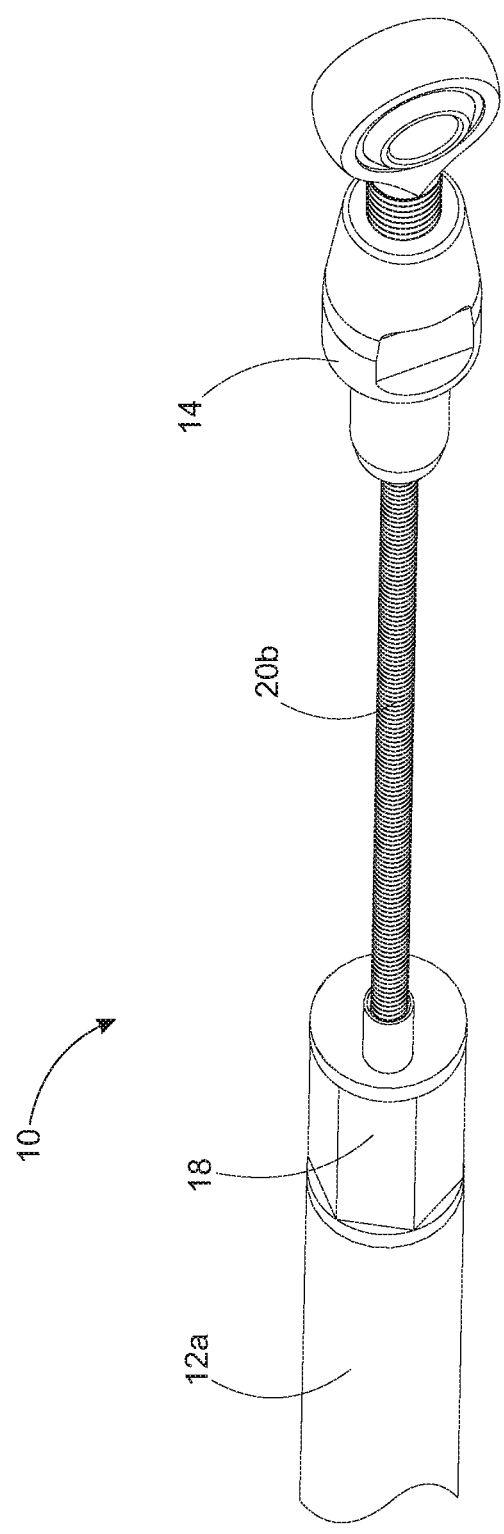
FIG. 8 is a zoomed in perspective view of the rod assembly of FIG. 5 with one tube member removed in accordance with an embodiment.

The rod 10 may further comprise two rod end members 16. Each rod end member 16 may be coupled to one rod coupler 14. The rod end members 16 may then be used to couple to a frame 32 and wheel component 34 with the end members 16 coupled to the frame 32 are also coupled to a shear plate 30 as depicted in FIG. 5-7. The configuration of the shear plate 30 with a plurality of rods 10 shown in FIG. 4 are provided as an exemplary use, with one of the rods 10 having the carbon fiber tube member 12 not visible to show the interior components of the rod 10, when coupled to a shear plate 30 on one end. And the rod 10 of FIGS. 5-8 may be substituted in for one or more radius rods 10 in FIG. 4. In particular embodiments, the rod 10 of FIGS. 5-8 may be substituted for the upper rod.

With exception to the specific material discussed above with regard to the carbon fiber tube member 12 and the inner threaded rod 20, the components defining any rod 10 may be formed of any of many different types of materials or combinations thereof that can readily be formed into shaped objects provided that the components selected are consistent with the intended operation of a radius rod. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any rod, such as a radius rod, may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

In another embodiment the method of making a rod, such as a radius rod for a suspension system, comprises providing a tube member comprising carbon fiber and having an aperture extending from a first end of the tube member through a second end of the tube member; locating an inner threaded rod member within the tube member; threadingly coupling two rod couplers onto opposing ends of the inner threaded rod member, extending a portion of each of the two rod couplers into the tube member and engaging the tube member on the first and second ends to maintain the inner threaded rod member coaxial with the tube member when the tube member is not under load; providing two rod end members; and coupling each of the two rod end members to one rod coupler of the two rod couplers.

The method may further comprise fixedly securing the two rod couplers to the tube member. The method may also comprise coupling a first rod end member of the two rod end members to a shear plate and a frame. The method may further comprise coupling a second rod end member of the two rod end members to a wheel component. The inner threaded rod member may comprise aluminum.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A radius rod assembly for use in a suspension of a vehicle comprising at least one radius rod, wherein the at least one radius rod comprises:

a tube member comprising carbon fiber and having an aperture extending from a first end of the tube member through a second end of the tube member;

an inner threaded rod member located within the tube member;

two rod couplers threaded onto opposing ends of the inner threaded rod member, the inner threaded rod member drawing the two rod couplers together for added strength and inhibiting the rod couplers from coming loose, wherein a portion of each of the two rod couplers extends into the tube member and is bonded to the tube member on the first and second ends to maintain the inner threaded rod member coaxial with the tube member when the tube member is not under load; and two rod end members, each of the two rod end members coupled to one rod coupler of the two rod couplers, wherein the two rod couplers are fixedly secured to the tube member and wherein the two rod end members couple the radius rod to suspension components of the vehicle.

2. The radius rod assembly of claim 1, wherein a first rod end member of the two rod end members is coupled to a shear plate and a frame.

3. The radius rod assembly of claim 2, wherein a second rod end member of the two rod end members is coupled to a wheel component.

4. The radius rod assembly of claim 3, further comprising a plurality of radius rods.

5. The radius rod assembly of claim 1, wherein the inner threaded rod member comprises aluminum.

6. A radius rod assembly comprising at least one radius rod, wherein the at least one rod comprises:

at least two tube members comprising carbon fiber, each of the at least two tube members having an aperture extending from a first end of each of the at least two tube members through a second end of each of the at least two tube members;

an inner threaded rod member located within each of the at least two tube members; each of the inner threaded rod members having opposing ends;

at least one center coupler provided between one of the opposing ends of each of the inner threaded rods;

two rod couplers respectively threaded onto an opposite one of the opposing ends of each of the inner threaded rod members, the inner threaded rod members drawing the two rod couplers together toward the at least one center coupler for added strength and inhibiting the rod couplers from coming loose, wherein a portion of each of the two rod couplers extends into each of the at least two tube members and is bonded to the at least two tube members on the first and second ends and the at least one center coupler extending into and bonded to each of the at least two tube members, the two rod couplers and the at least one center coupler operating to maintain each of the inner threaded rod members coaxial with each of the at least two tube members when each of the at least two tube members is not under load; and two rod end members, each of the two rod end members coupled to one rod coupler of the two rod couplers, wherein the two rod end members couple the at least one radius rod to suspension components of a vehicle.

7. The radius rod assembly of claim 6, wherein the two rod couplers are fixedly secured to each of the at least two tube members.

8. The radius rod assembly of claim 6, wherein a first rod end member of the two rod end members is coupled to a shear plate and a frame.

9. The radius rod assembly of claim 8, wherein a second rod end member of the two rod end members is coupled to a wheel component.

10. The radius rod assembly of claim 9, further comprising a plurality of radius rod assemblies.

11. The radius rod assembly of claim 6, wherein each of the inner threaded rod members comprises aluminum.

12. A method of making a radius rod for use with a vehicle, wherein the method comprises:

providing a tube member comprising carbon fiber and having an aperture extending from a first end of the tube member through a second end of the tube member;

locating an inner threaded rod member within the tube member;

threadingly coupling two rod couplers onto opposing ends of the inner threaded rod member;

drawing the two rod couplers together for added strength and inhibiting the rod couplers from coming loose;

extending a portion of each of the two rod couplers into the tube member and bonding the tube member on the first and second ends to maintain the inner threaded rod member coaxial with the tube member when the tube member is not under load;

providing two rod end members; and coupling each of the two rod end members to one rod coupler of the two rod couplers; and fixedly securing the two rod couplers to the tube member, wherein the two rod end members are configured to couple the radius rod to suspension components of the vehicle.

13. The method of claim 12, further comprising coupling a first rod end member of the two rod end members to a shear plate and a frame.

14. The method of claim 13, further comprising coupling a second rod end member of the two rod end members to a wheel component.

15. The method of claim 12, wherein the inner threaded rod member comprises aluminum.

* * * * *